Dec. 14, 1948.  C. G. GERHOLD  2,456,398
FRACTIONATION CONTROL APPARATUS
Original Filed Dec. 10, 1942  6 Sheets-Sheet 4
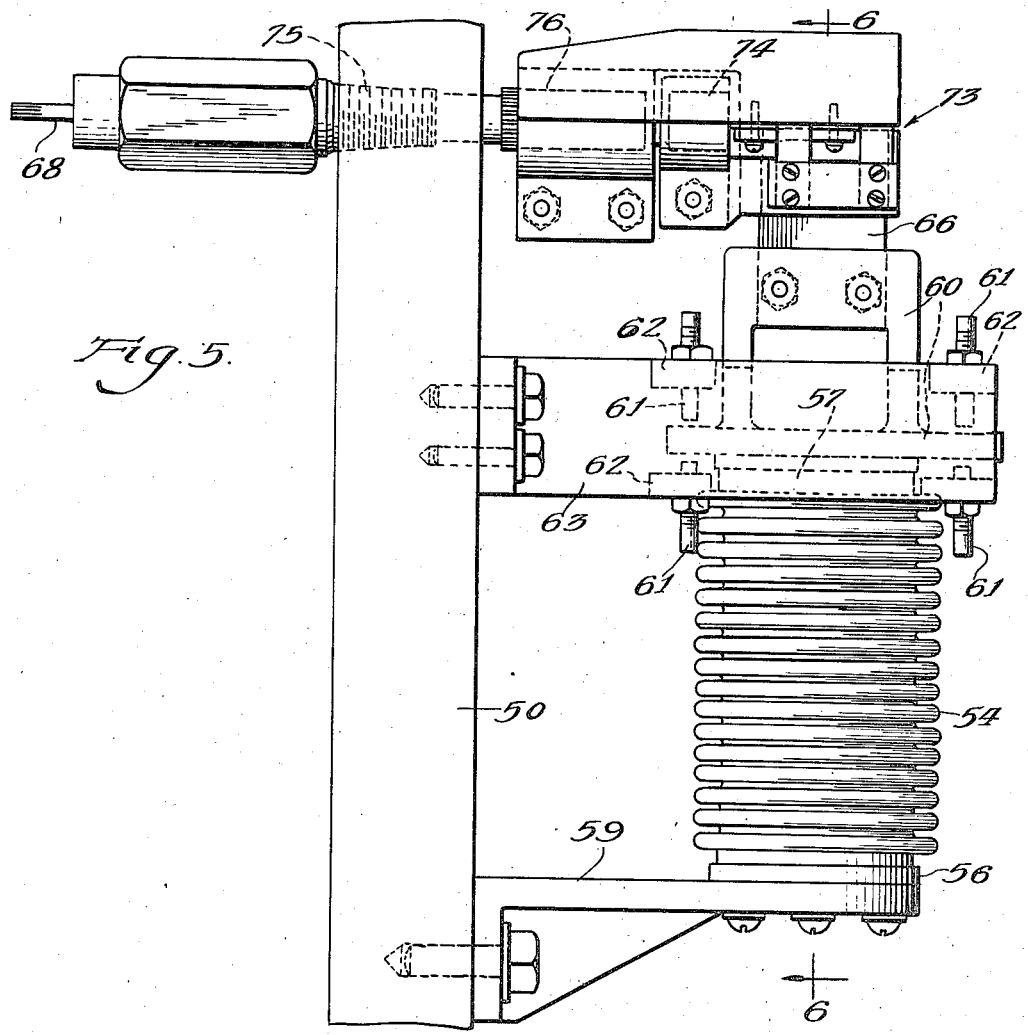
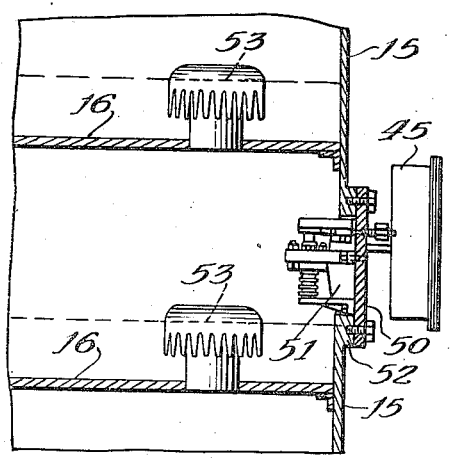
Inventor:
Clarence G. Gerhold
By Lee J. Gary
Attorney.

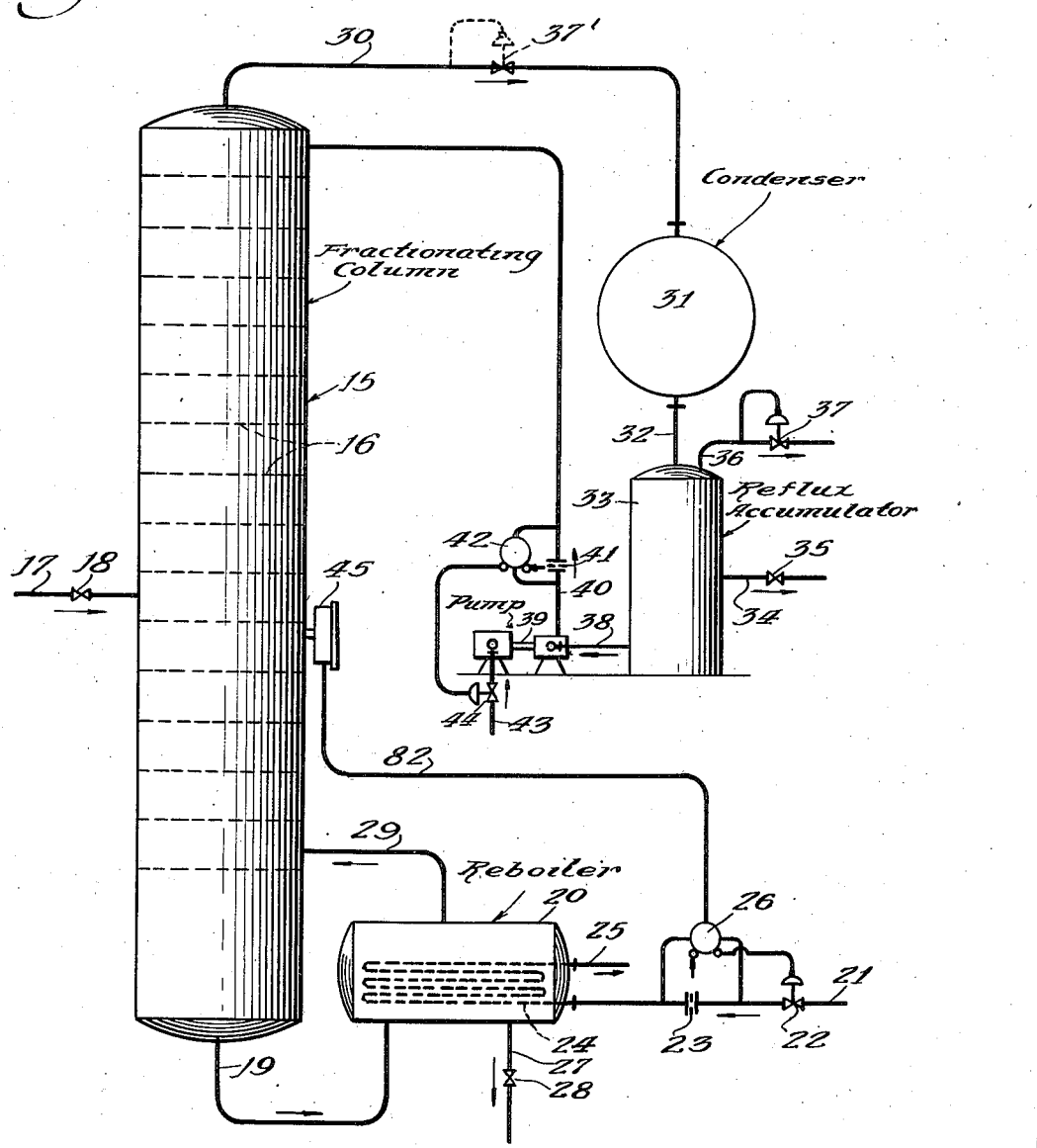

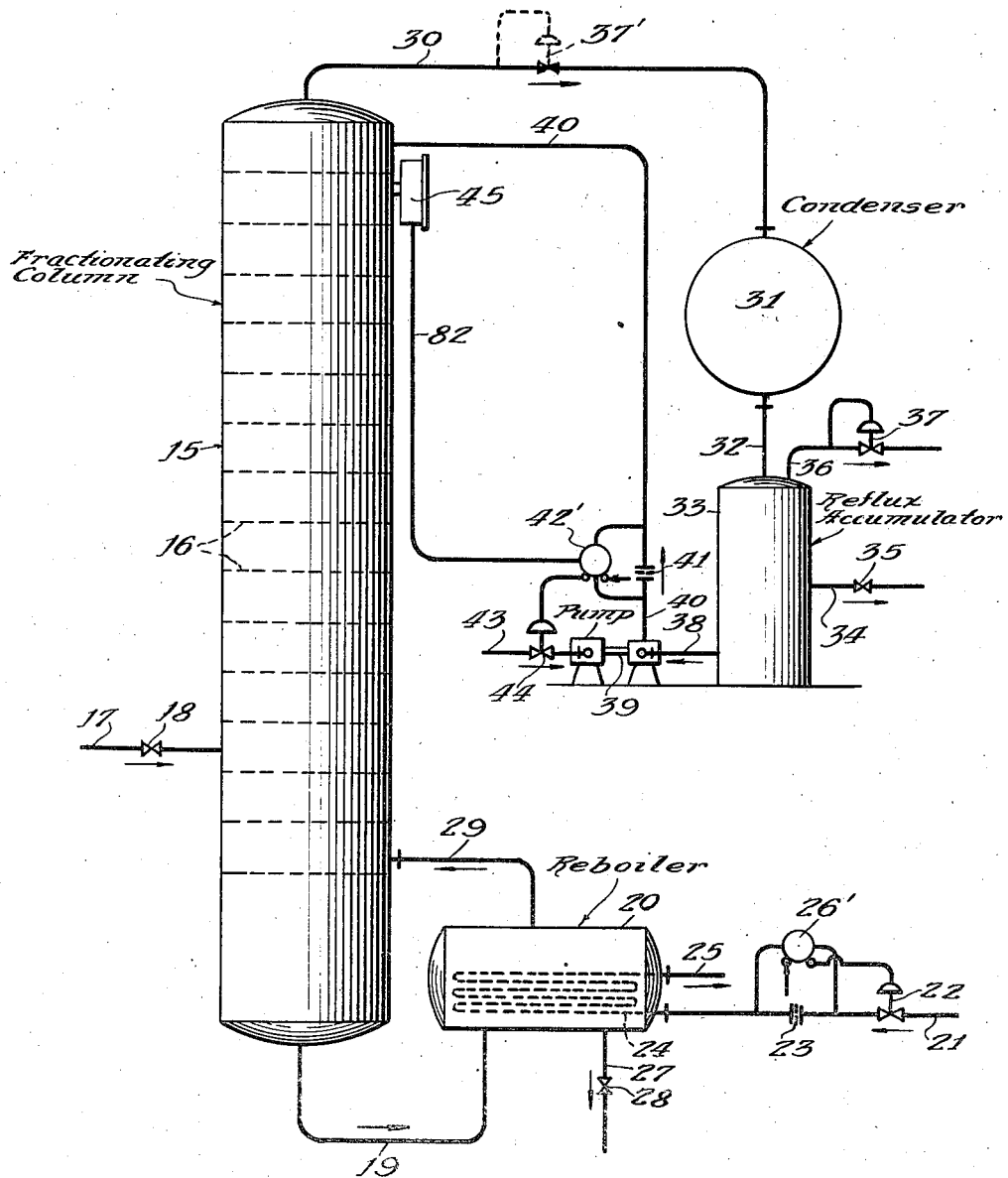

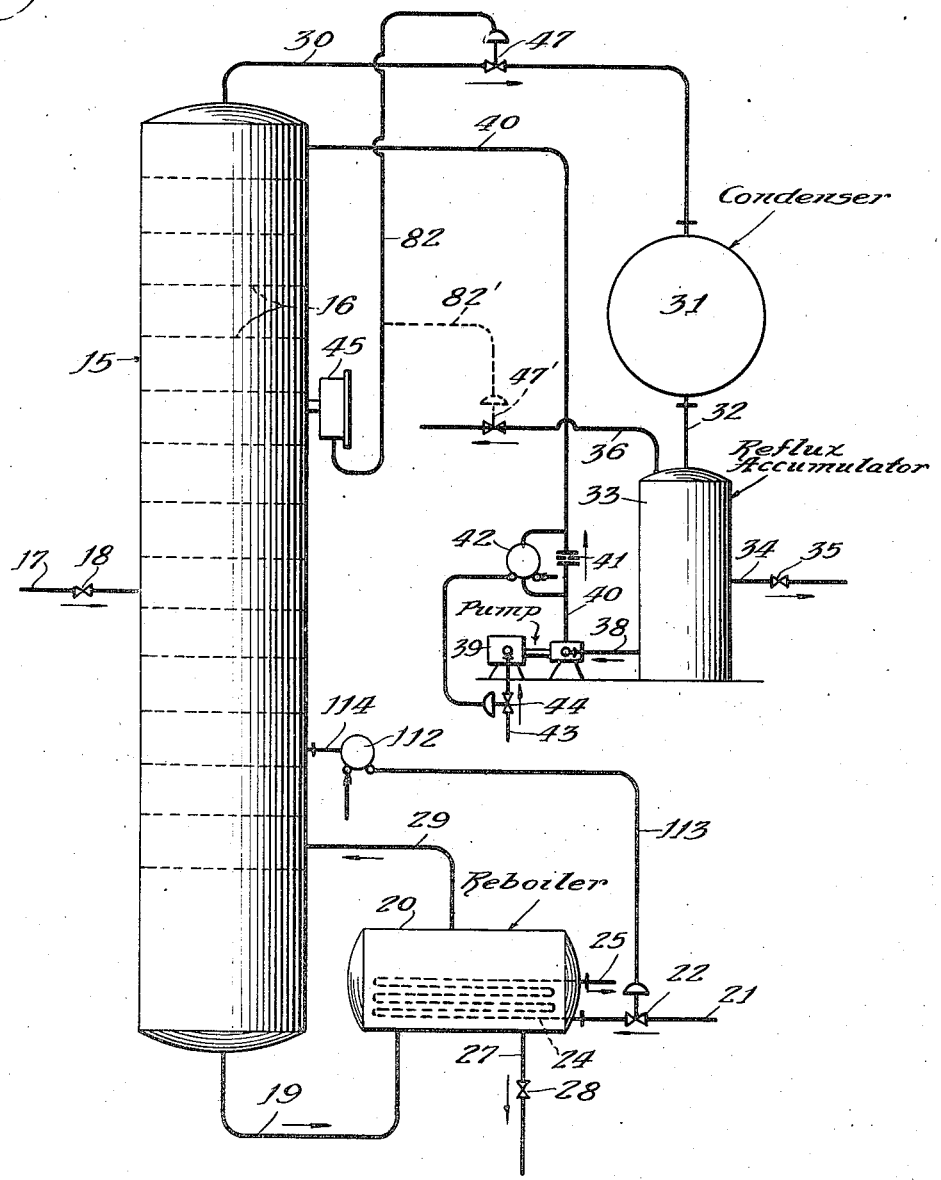

Dec. 14, 1948.                    C. G. GERHOLD                    2,456,398
                          FRACTIONATION CONTROL APPARATUS
Original Filed Dec. 10, 1942                              6 Sheets-Sheet 5
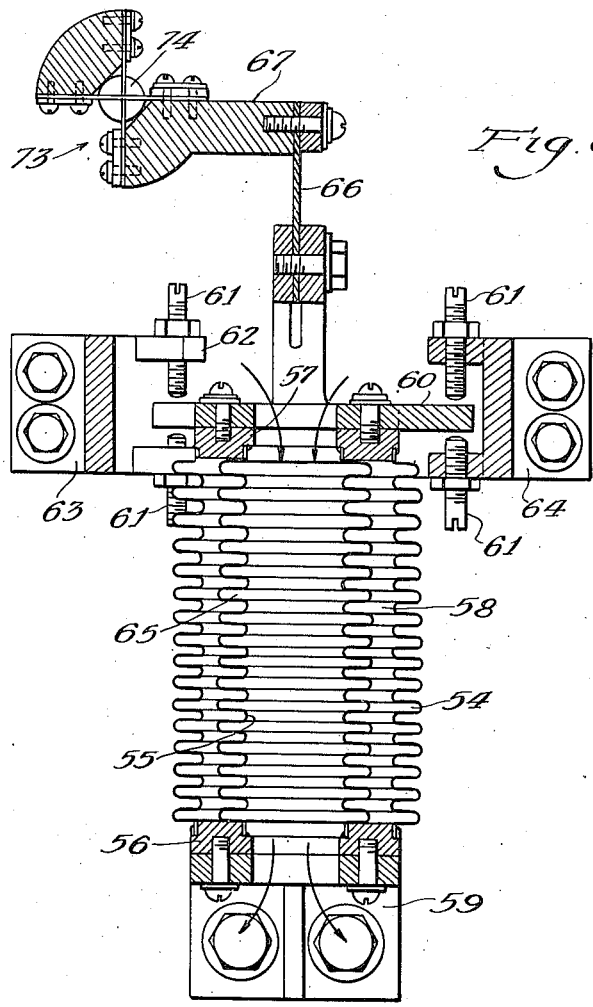
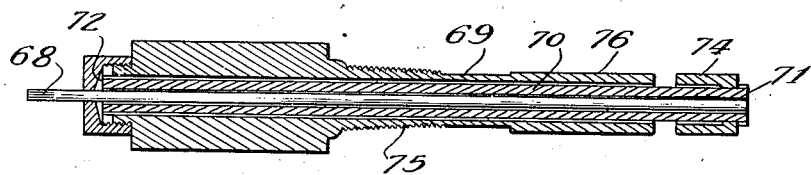
Inventor:
Clarence G. Gerhold
By Lee J. Gary
Attorney.

Dec. 14, 1948.  C. G. GERHOLD  2,456,398
FRACTIONATION CONTROL APPARATUS
Original Filed Dec. 10, 1942  6 Sheets-Sheet 6

Inventor:
Clarence G. Gerhold
By Lee J. Hary
Attorney

Patented Dec. 14, 1948

2,456,398

UNITED STATES PATENT OFFICE 2,456,398

FRACTIONATION CONTROL APPARATUS

Clarence G. Gerhold, Chicago, Ill., assignor to Universal Oil Products Company, Chicago, Ill., a corporation of Delaware Original application December 10, 1942, Serial No. 468,509. Divided and this application October 27, 1944, Serial No. 560,527

10 Claims. (Cl. 196—132)

This application is a division of Serial No. 468,509, filed December 10, 1942 and now abandoned.

The invention relates to an improved apparatus for effecting the separation of selected components from a mixture of materials of different boiling points by fractional distillation of the mixture. The invention is particularly advantageous as applied to the separation of materials having boiling points which are relatively close together and is particularly intended to fulfill a need in the oil refining industry for a method and means of separating close-cut, selected fractions from multiple component mixtures of normally gaseous or normally liquid hydrocarbons on a commercial scale.

The advent and rapid adoption of catalytic processes for the conversion of hydrocarbons, such as, for example, the catalytic polymerization of olefins, the catalytic alkylation of paraffins, aromatics or naphthenes with olefins and the catalytic isomerization of normal paraffins and olefins, demand, for best results, the fractionation of available charging materials or products of the operation, or both, to separate relatively pure selected fractions from a mixture comprising components boiling relatively close to the boiling point of the desired fraction.

In many instances the mixture from which the desired fraction is to be separated contains components boiling only a few degrees Fahrenheit above and below the boiling point of the desired fraction and good separation therebetween is difficult, if not impossible, to achieve by previous methods which are applicable to operation on a commercial scale. Laboratory methods of separating relatively pure individual hydrocarbons are, in most instances, not applicable to plant operation. The present invention is particularly addressed to the solution of such problems.

The applicability of the invention to a wide variety of fractionating problems encountered in various branches of the chemical industries will be apparent to those conversant with the art of fractional distillation. However, for the purpose of illustration, the subsequent description will be directed principally to the separation of hydrocarbons and more particularly to the separation of normally gaseous hydrocarbons.

The apparatus provided by the invention relies for its successful operation upon the vapor pressure characteristics of the material to be separated, as compared with the vapor pressure characteristics of the next higher boiling or next lower boiling components of the mixture from which its separation is effected. By controlling the fractionating operation to maintain a substantially constant differential at a selected point in the fractionating system between the pressure exerted by the material undergoing fractionation at that point and the pressure exerted by a reference material of known vapor pressure characteristics at the temperature exising at said control point in the fractionating system, I am able to recover an overhead or a bottoms product from the fractionator of substantially constant vapor pressure and accordingly of substantially constant composition. Visual indication of this difference in vapor pressure at the control point may be accomplished by any of several types of instrumentalities which will be subsequently described. The control of operating conditions to maintain a substantially constant differential at the control point may be manual, but in the preferred embodiment of the invention is accomplished by suitable automatic control instruments which will also be subsequently described.

The separation of one or more selected components from a mixture of materials of different boiling points by fractional distillation is accomplished, according to conventional methods, in a fractionating column having three separate controls. These are, (1) control of the general operating temperature-pressure level, (2) control of the reflux ratio and (3) the control which sets the composition of the product by adjustment of the heat and material balance. The present invention involves the use of each of these three general controls, but its novelty and advantages reside in improvements to the third control, above mentioned.

In conventional operation when it is desired to obtain an overhead product of substantially constant composition, the top temperature of the fractionating column is maintained constant within relatively close limits. If the composition of the bottoms product is to be maintained substantially constant, the bottom temperature of the fractionating column is maintained constant within relatively close limits. Thus, separation is effected on the basis of difference in boiling points between the fraction to be recovered and the higher boiling or lower boiling components of the mixture undergoing fractionation. Obviously, separation on this basis requires the maintenance of a substantially constant operating pressure in the fractionating column since boiling points vary in inverse relation to the pressure. The difficulty encountered by this conventional method, in attempting to make a separation between fractions which boil relatively close together, results from the inability to maintain constant operating pressure within the extremely close limits required for good separation. Pressure fluctuations which cannot be eliminated result from variations in the load on the fractionating column and inherent imperfections in even the best pressure control instruments now available. As a result of such fluctuations in operating pressure, even though they may be small, a controller which maintains constant temperature at the top or at the bottom of the fractionating column actually causes variations in the composition of the product by failure to adjust the temperature to compensate for changes in pressure.

In contradistinction to the conventional method of operation above outlined, the method provided by the invention does not involve maintaining a constant temperature at the control point in the fractionating system but adjusts the heat and material balance in response to minor variations between the pressure exerted by the material undergoing fractionation at the control point and the pressure exerted by a reference material of known vapor pressure characteristics maintained at a temperature substantially corresponding to that existing in the fractionator at said control point. Due to the approximate parallelism of vapor pressure curves for materials of similar compositions, maintaining a substantially constant pressure differential between the reference material of known composition and the material undergoing fractionation gives a much closer approach to maintaining a definite composition gradient between these materials than can be obtained by maintaining a constant temperature at the control point. With this improved method of control, permissible fluctuations in operating pressure may be quite large and better control than can be obtained by conventional methods is accomplished even when the pressure variations are of a minor nature.

Due to the approximate parallelism between the vapor pressure curves of materials, such as hydrocarbons, of similar chemical composition but different and relatively close boiling point, a considerable leeway is possible in the choice of the reference material above mentioned. However, the optimum sensitivity and freedom from the effect of changes in operating pressure is attained when the vapor pressure characteristics of the reference material are identical to the vapor pressure characteristics of the material desired in the fractionating system at the control point. A close approach to this condition is advantageous and, in the preferred embodiment of the invention, the composition of the reference material corresponds to or closely approaches that of the material which it is desired to maintain in the fractionating system at the control point. It is, however, within the scope of the invention to employ any reference material having vapor pressure characteristics which can be correlated with the vapor pressure characteristics of the material which it is desired to maintain in the fractionating system at the control point.

The aforementioned and other features and advantages of the invention will be apparent with reference to the accompanying diagrammatic drawing and the following description thereof.

In the drawing Figure 1 illustrates a fractionating system with controls which permit its operation in the improved manner provided by the invention.

Figure 2 illustrates a similar fractionating system in which the method of control, accomplished in accordance with the features of the invention, differs from the specific method illustrated in Figure 1.

Figure 3 illustrates another similar fractionating system with controls which permit another specific mode of operation provided by the invention but different from that employed in the preceding figures.

Figure 4 illustrates a portion of a fractionating column equipped with one specific form of the device provided by the invention for measuring pressure difference between the material undergoing fractionation within the column and a reference material of predetermined vapor pressure characteristics.

Figure 5 is an enlarged detail of a portion of the apparatus shown in Figure 4.

Figure 6 is another view, shown partially in section, of the device illustrated in Figure 5, taken along line 6—6 in Figure 5.

Figure 7 shows a longitudinal section of a portion of the device illustrated in Figure 5.

Figure 8:
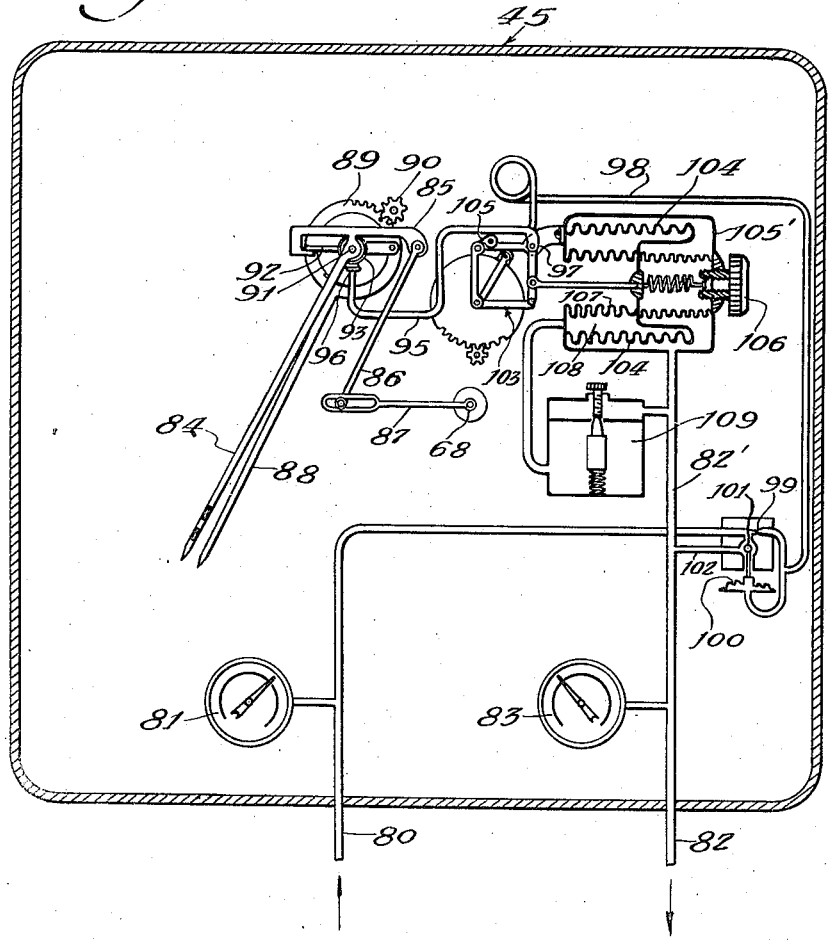

Figure 8 diagrammatically illustrates the important features of one specific form of control instrument which may be employed with the device illustrated in Figures 4, 5, 6 and 7 for automatically controlling the operating conditions of the fractionating column in accordance with the features of the invention.

Figure 9:
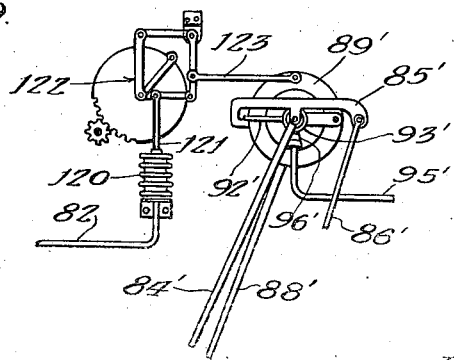

Figure 9 diagrammatically illustrates a portion of another specific form of control instrument which may be utilized, as will be later explained, in accomplishing the improved mode of operation provided by the invention.

Referring now particularly to Figure 1, the apparatus here illustrated comprises a fractionating column 15 of any suitable conventional type employing suitable contacting means such as perforated plates, bubble decks or the like, indicated at 16. The mixture to be fractionated is supplied, preferably in heated essentially vaporous or gaseous state, through line 17 and valve 18 to an intermediate point in the fractionating column and, in the case illustrated, is separated into a liquid bottoms fraction and a lower boiling overhead vaporous or gaseous stream.

Provision is made for reboiling the bottoms fraction to substantially free the same of undesired light components by directing liquid accumulated in the lower portion of the column through line 19 to reboiler 20, wherein it is reboiled by passing steam, hot oil, or other suitable heating medium through line 21, flow control valve 22, orifice 23 and closed coil 24, disposed within the reboiler, in indirect contact and heat transfer relation with the bottoms supplied to this zone from the column. The heating medium is discharged from coil 24 through line 25 and the quantity thereof passed through the reboiler is regulated at valve 22 by a flow-control instrument 26 which may be one of any of the several well known types of flow controllers equipped with means for adjusting the control point. One suitable form of this instrument is illustrated in Figure 9 and will be later described. The reboiled bottoms fraction is discharged from the reboiler through line 27 and valve 28 to cooling and storage or elsewhere, as desired. Vapors and/or gases evolved in the reboiler are directed therefrom through line 29 back to the lower portion of the fractionating column.

Vapors and/or gases, comprising the relatively light components of the mixture supplied to the fractionating column which are not retained in the heavier reboiled bottoms fraction, are directed from the upper portion of the fractionator through line 30 to condenser 31 wherein they are partially or completely condensed, as desired, and wherefrom resulting condensate, together with any uncondensed components is directed through line 32 to reflux accumulator 33. Regulated quantities of the distillate collected in accumulator 33 are discharged therefrom through line 34 and valve 35 to storage or elsewhere, as desired, and represent the net make of this material recovered in the fractionating operation.

In case the overhead stream from column 15 is not completely condensed in condenser 31, the uncondensed fractions are released from the accumulator through line 36 and the automatic pressure control valve 37, which latter serves to maintain a fairly constant operating pressure in the fractionating system. Alternatively, when desired, and particularly in case total condensation of the overhead stream is obtained in condenser 31, an automatic pressure control valve 37', indicated by dotted lines in the drawing, may be disposed in line 30 between the fractionator and the condenser to maintain the desired operating pressure on the column.

To provide refluxing and cooling liquid for the column, regulated quantities of the distillate collected in accumulator 33 are directed therefrom through line 38 to pump 39 by means of which this material is fed through line 40 and orifice 41 to the upper portion of column 15. In the case illustrated, the refluxing medium is supplied to the column at a fixed rate determined by the setting of another suitable flow-control instrument 42 of any desired form and which, in this particular instance, functions to adjust the opening through valve 44 in line 43, through which steam for the motivation of pump 39 is supplied thereto.

The fractionating system so far described in conjunction with Figure 1 is conventional and such a system is commonly utilized, for example, to stabilize gas-containing distillate to the desired vapor pressure by liberating from its normally liquid fractions all or regulated quantities of the dissolved gases. As conventionally operated, the quantity of heat required under normal conditions for reboiling the bottoms in reboiler 20 and maintaining the desired vapor pressure in the reboiled bottoms product is calculated on the basis of the expected temperature, composition and rate of feed of the mixture supplied to the column through line 17 and the operating pressure of the column, and control instrument 26 is set to maintain a constant heat input to the reboiler by maintaining a constant differential pressure across orifice 23. Since any of the factors on which this calculation is based may vary from time to time during operation of the column, an attempt is made in conventional operation to compensate for these variations by adjusting the control point of instrument 26, either manually or automatically, in response to minor changes in the temperature prevailing in the reboiler or at some other selected point in the system. Automatic adjustment may be accomplished by a suitable temperature control instrument receiving impulses from a thermocouple, mercury bulb or other suitable temperature sensitive device disposed at the control point in the fractionating system, the temperature controller translating these impulses into a force which is transmitted to the flow-control instrument 26 and changes the flow rate which the instrument is set to maintain, the set flow rate being decreased as the temperature at the control point rises and increased as the temperature at the control point recedes so as to maintain a substantially constant reboiler temperature.

Operation in the conventional manner above outlined is based on the assumption that the composition of the reboiled bottoms product will be constant at a constant temperature. This assumption is correct only under special conditions and particularly when the pressure maintained in the fractionating column remains constant. In addition to variations in operating pressure which occur as a result of pressure control valve 37 or 37' operating over a range of pressure, as do all pressure control valves, changes in operating pressure may occur as a result of an increased or decreased load on the column (i. e., in the rate at which the mixture to be fractionated is supplied to the column through line 17) or a change in the operating pressure of the equipment from which the mixture undergoing fractionation is derived. With a constant reboiler temperature an increase or decrease in the pressure prevailing within the fractionating column will result in a corresponding increase or decrease in the vapor pressure of the reboiled bottoms. Therefore, with this conventional method of control and all other methods which seek to maintain a constant temperature at the control point, the composition of the light and heavy fractions, between which separation is made in the fractionator, will vary with variations in the pressure prevailing in the fractionating column.

The present invention provides a method and means of effecting a marked improvement in fractionation over that obtained by the conventional method of control above outlined. This is accomplished by substituting a comparative or differential vapor pressure control for temperature control. In the case illustrated in Figure 1, a control instrument 45, which is sensitive to slight changes in the pressure prevailing in the fractionating column at the control point as compared with the pressure exerted by a reference material in a confined zone at substantially the same temperature, operates to adjust the control point setting of flow controller 26, thus varying the heat supplied to the reboiler in response to and in inverse relation to such changes.

There are several types of instruments by means of which the aforementioned control provided by the invention may be accomplished. For example, differential pressures can be measured by manometers, bellows, diaphragms or interlinked Bourdon tubes and any of these various types of differential pressure meters are adaptable for accomplishing the object of the invention. An illustration of the adaptation of one of these various types of instruments is deemed adequate for a clear understanding of the invention by those familiar with the art. The type of instrument chosen for illustration employs a bellows, commonly known among those familiar with industrial indicating, recording and control instruments as a "hydron." I prefer this type of device to the others above mentioned for several reasons which will be later explained and its preferred form is illustrated and described in considerable detail in conjunction with Figures 4 to 8, inclusive, of the drawing. Therefore, before proceeding with the description of Figures 2 and 3, we will refer to Figures 4 to 8, inclusive, for a better understanding of this preferred type of instrument.

Referring now particularly to Figures 4, 5, 6 and 7, an instrument, such as shown at 45 in Figure 1 and here indicated by the same reference numeral, is suitably mounted on a blind flange 50 which forms a detachable cover-plate for an opening 51 provided in the wall of the fractionator. The fractionator is again designated, as in Figure 1, by the reference numeral 15. The opening 51 is disposed at a selected point in the column between adjacent bubble trays 16 and, in the case illustrated, flanges 50 is detachably bolted to the wall of the column or to a pad 52 which is welded or otherwise suitably joined to the cylindrical wall, although a conventional nozzle or other suitable means of access to the column may be substituted, when desired.

The element which is sensitive to pressure changes within the column and the means associated therewith for transmitting movement in this element to the control instrument 45 is also mounted on flange 50 and is disposed within the fractionating column, preferably in the vapor space between adjacent bubble trays 16. However, the pressure-sensitive element may, when desired, be immersed in the liquid on one of the trays, the liquid level maintained on the tray being indicated, in the case illustrated, at 53. When disposed in the vapor space, as illustrated, the pressure-sensitive device will not be affected by eddy currents in the liquid or the general movement of liquid on the tray. In case it is immersed in the pool of liquid on the tray, I preferably select a zone in the latter which is relatively quiescent and not too close to a bubble cap or downpipe.

As indicated in Figure 6, the pressure-sensitive element or "hydron" of the device comprises an external bellows-like member 54 and smaller internal bellows-like member 55, each of which is substantially cylindrical in form and is suitably joined in a pressure-tight manner at one end to a stationary, washer-like member 56 and at its opposite end to a movable, washer-like member 57. Members 56 and 57 serve to close the annular space 58 between members 54 and 55 and this space is partially filled with a suitable reference fluid, such as previously mentioned, of known vapor pressure characteristics. Member 56 is bolted, as illustrated, or otherwise suitably secured to a substantially rigid bracket 59 mounted, as illustrated, on flange 50. Member 57 is bolted, as illustrated, or otherwise suitably attached to a member 60 which, in the case illustrated, has three radial arms, each of which extends between a pair of set screws 61 which serve as stops to limit movement of the free end of the "hydron." The set screws are threaded, in the case illustrated, to suitable lugs 62 provided on the substantially rigid brackets 63 and 64 which, in turn, are mounted, as illustrated, on flange 50.

The exterior surface of bellows-member 54 and the interior surface of bellows-member 55 are in contact with the fluid medium comprising, in the case illustrated, the mixture of vapors and/or gases prevailing between the adjacent bubble trays. The exterior surface of bellows member 55 and the interior surface of 54 are in contact with the reference fluid disposed in space 58 so that the latter is maintained at essentially the same temperature as the vapor or vapor-gas mixture between the trays.

By providing two bellows-members, arranged as illustrated, I obtain a high ratio of heater transfer surface to volume for the reference fluid within the "hydron" and this, in conjunction with the provisions for permitting free circulation through the space 65 within the "hydron," materially assists in maintaining a negligible temperature difference between the reference fluid and the fluid surrounding the "hydron." The bellows 54 and 55 are, of course, flexible members formed of relatively light gauge metal, such as, for example, copper, aluminum, stainless steel or other metal or alloy selected to suit the particular conditions of service encountered and I preferably avoid the disposition, close to the bellows-members, of any mass of metal which would act as a heat reservoir. Thus, a high order of sensitivity is obtained in the "hydron," any change in the temperature of the surrounding fluid being quickly transmitted to the reference fluid within the "hydron."

In operation, any change in the pressure prevailing in the surrounding fluid, as compared with the pressure exerted by the reference fluid within the "hydron" tends to contract or elongate the "hydron," depending upon the direction of the change in differential pressure and to a degree corresponding to the magnitude of the change. Thus, expansion of the bellows indicates an increase of the internal pressure in the "hydron" as compared with the external pressure and contraction of the bellows indicates an increase in the external pressure as compared with the internal pressure. The movement of member 60 with expansion and contraction of the bellows-members is transmitted, in the case illustrated, by a flexible metal member 66 to the movable arm 67 of a torsion tube device which translates linear movement of the "hydron" into rotary movement of shaft 68 (see Figure 5), which extends through flange 50 and into the case of instrument 45 where it is connected by suitable linkage, as will be later described, to the operating mechanism of the instrument.

The torsion tube device above referred to is a mechanism commonly employed by instrument manufacturers in situations where it is desirable to avoid packing a rotary shaft. Due to the familiarity of those conversant in the art with this type of device, it need not be described here in detail and may within the scope of the invention assume any of its several well known specific forms. A portion of this device is illustrated in detail by the longitudinal cross-section, as shown in Figure 7. A force applied by movement of the "hydron" through the frictionless bearing arrangement 73 (see Figures 4 and 5) imparts a true rotary motion to the inner end 74 of the device, causing a slight twist in tube 70 between its inner end of attachment at 71 to shaft 68, and its outer end, which is attached at 72 to sheath 69, the latter being screwed into flange 50 at 75 and held rigid. Thus, shaft 68 is rotated through a small arc and packing for the shaft where it passes through flange 50 is eliminated, thus obviating a variable resistance to rotation of the shaft which would occur if a stuffing box and packing were utilized.

Since the "hydron" is extremely sensitive to small changes in differential pressure, its maximum movement, as fixed by the stops, will ordinarily be quite small, for example, of the order of one-tenth of an inch, or thereabouts, and the rotational movement of shaft 68 may be of the order of six to eight degrees, or thereabouts.

Preferably, the torsion tube 70 (see Figure 7) acts as a spring which is retained in tension when the "hydron" is expanded to the maximum degree permitted by adjustment of the stops, the tension being decreased as the "hydron" expands. Thus, the flexible member 66, linking member 60 on the "hydron" with arm 67, is always in tension, eliminating the possibility of distortion in this flexible member which might absorb expansive movement of the "hydron" rather than transmitting it to arm 67.

One specific modification contemplated in an instrument of the same general type illustrated and above described, substitutes a plurality of individual bellows members or "hydrons" of relatively small diameter for the larger bellows 54 and 55 of Figure 6. In such cases the individual small diameter "hydrons" are secured at their opposite ends to members similar to members 59 and 60 of Figure 6, and the individual "hydrons" may be disposed in a straight line, circle or any other desired geometrical arrangement. This will give an even higher ratio of heat transfer surface to volume in the "hydrons" and also provides for good contact between all portions of the heat transfer surfaces of the "hydrons" and the surrounding fluid. Also by using a multiplicity of small diameter "hydrons," in place of "hydrons" 54 and 55 of larger diameter, the pressure which the "hydrons" will safely withstand may be substantially increased without decreasing their flexibility or decreasing the sensitivity of the device.

The instrument 45 of Figure 4 may be a simple form of indicating or recording instrument in which the partially rotatable arm 68 (see Figure 5) is linked through a suitable lever arrangement of conventional form, not illustrated, to an indicating pointer or recording pen. Instruments of this type are familiar to those conversant with the art and to avoid unnecessary complication of the drawing are not here illustrated.

In the preferred embodiment of the invention, the instrument 45, with which the pressure sensitive device of Figures 4, 5, 6 and 7 is connected, is of the automatic control type and may comprise any of several varieties of such instruments now available. One of these, namely, a Taylor "Fullscope" recording controller is shown schematically in Figure 8 and will now be described.

The instrument shown in Figure 8 is of the air-operated type, compressed air for its operation being supplied thereto through line 80 at a substantially constant pressure indicated by pressure gauge 81. The output air line 82, to which the indicating pressure gauge 83 is attached, leads, in the case illustrated in Figure 1, to instrument 26 and the air pressure transmitted through line 82 serves, as will be later described, to maintain or readjust the set point of instrument 26 in accordance with impulses transmitted to instrument 45 through shaft 68 (see Figure 5).

The recording pen arm 84, which is rigidly attached to arm 85 and linked through levers 86 and 87 with shaft 68, indicates and records, on a suitable chart, not illustrated, the rotational position of arm 68 in terms of difference in pressure within and exterior to the "hydrons" 54 and 55 of Figure 6. The pointer arm 88, which is attached to the rotatable gear 89, indicates on the same scale or chart the desired differential pressure to be maintained between the fluid within and that surrounding the "hydron," and its position may be adjusted to suit requirements by the rotation of a suitable knob, not illustrated, which is attached to gear 90, the latter being meshed with gear 89.

So long as the positions of pen 84 and pointer 88 coincide, the pressure exerted by the material undergoing fractionation at the selected control point in the fractionating column bears the desired relation to the pressure exerted by the reference fluid within the "hydrons" and the set point of instrument 26 (Figure 1) is maintained by the air pressure transmitted thereto from instrument 45 through line 82. Any deviation in the desired relationship between the pressure exerted by the material undergoing fractionation at the control point in the fractionating column and the reference fluid results in a deviation of pen 84 from a position coinciding with that of pointer 88 and changes the air pressure transmitted through line 82 to readjust the set point of flow controller 26 so that more or less heat, as required, is supplied to the reboiler, thus changing the heat input to the fractionating column so as to bring the vapor pressure and composition of the material undergoing fractionation at the control point back to that desired, and return pen 84 to a position corresponding to that of pointer 88.

We will now consider how instrument 45 functions to vary the air pressure transmitted through line 82 to accomplish the above stated object. Assuming that the pressure exerted by the material undergoing fractionation at the control point becomes too high, indicating that its composition is too light and that less heat should be supplied to the reboiler, the bellows 54 and 55 of Figure 6 will contract, causing shaft 68 to rotate, as viewed in Figure 8, in a counter-clockwise direction and causing pen 84 to move to the left away from indicator 88. This causes arm 85 to rotate in a clockwise direction about its pivot point 91 so that its left-hand end contacts and lifts arm 92 of the circular baffle 93 which is pivoted at its right-hand end to gear 89, as indicated at 94. The circular baffle 93 regulates the flow of air through the bleed line 95 by variation in the elevational position of the baffle in relation to the outlet nozzle 96 of the bleed line. In the particular instance being considered, baffle 93 is lifted and more air flows through line 95 and nozzle 96.

Line 95 is pivoted at 97 and is connected to line 98 which communicates through a suitable restriction 99 with the input air line 80. Line 80 also communicates through the restriction 99 with a flexible diaphragm 100, movement of which regulates the position of ball 101 to vary the flow of air from line 80, on the upstream side of restriction 99, through line 102 into the output air line 82. Line 98 also communicates with the diaphragm 100 so that when more air is bled from the system by the lifting of baffle 93, the air pressure on diaphragm 100 decreases, lowering ball 101 and increasing the pressure in the air output line 82. The increased air pressure in line 82 adjusts the set point of instrument 26, as will be later explained, to admit less heat to the reboiler and bring the vapor pressure and composition of the material undergoing fractionation at the control point back to the desired value. This rotates shaft 68 in a clockwise direction, as viewed in Figure 8, returning pen 84 to a position coinciding with pointer 88. Meanwhile, the automatic reset mechanism of instrument 45, which is described below, has lowered nozzle 96 by the downward movement of line 95 so that the increased pressure in the output air line 82 does not return to its former value when pen 84 is returned. Thus, instrument 26 operates at its new setting until some other change in the conditions prevailing within the fractionating column function to readjust the setting of instrument 26 for maintaining a lower or a higher rate of heat input to the reboiler.

Obviously, when a change opposite to that above described occurs in the fractionator, necessitating increased heat input through the reboiler, instrument 45 functions opposite to the operation above described, reducing the air pressure in line 82 and adjusting the set point of instrument 26 in the opposite direction to give an increased flow of heating medium to the reboiler.

The instrument 45 here illustrated embodies the refinements commonly known as "adjustable sensitivity" and "automatic reset." The provisions of adjustable sensitivity functions to regulate the proportional response of the instrument (i. e., the ratio of output pressure change to the movement of the recording pen or indicator). This is ordinarily necessary in such applications of automatic control as are herein provided to prevent the instrument from hunting or overcontrolling by reducing its sensitivity. With reduced sensitivity, the position of nozzle 96 follows the movement of baffle 93 to a limited extent. This is accomplished, in the case illustrated, through the adjustable parallelogram arrangement 103 which moves to raise and lower line 95. Parallelogram 103 is connected on one side with the bellows or "hydron" 104 and has an adjustable cam 105 on an adjacent side which contacts line 95 to raise and lower the latter with movement of the parallelogram. An inward extension 82' of the air output line 82 admits air from this line into the case 105' about the bellows 104 so that when the pressure in line 82 increases, bellows 104 contracts and moves the parallelogram to lift line 95, causing nozzle 96 to follow the upward movement of baffle 93 and limit the increased air bleed from nozzle 96 so as to reduce the sensitivity of the instrument. When the air pressure in line 82 is decreased, bellows 104 expands, causing line 95 and nozzle 96 to be lowered and follow the downward movement of baffle 93.

The feature of automatic reset provided in instrument 45 eliminates the necessity for manually adjusting synchonizing wheel 106, as would otherwise be necessary to compensate for load changes in the fractionator. This feature embodies the use of a second bellows member 107, on the inside of bellows member 104, and connection of the space 108 between these bellows members with the output air line through an adjustable needle valve device indicator at 109. With this arrangement the air pressure in the space 108 is equalized at the desired rate with the pressure existing in the space between bellows 104 and case 105, after any change in the pressure in air output line 82 occurs. Thus, in the operation above described, by the time the pen arm 84 has moved back to a position coinciding with pointer 88, line 95 and nozzle 96 have been lowered by movement of the parallelogram 103 to somewhat below the position which it formerly occupied with reference to baffle 93 before the initial deviation of pen 84 occurred. Thus, the increased air pressure is maintained in line 82 and instrument 26 remains at its new setting.

Referring now to Figure 2, wherein the reference numbers corresponding to those of Figure 1 indicate corresponding equipment with corresponding functions, the control point setting of flow controller 42', which replaces flow controller 42 of Figure 1, is automatically adjusted by instrument 45, while the flow controller 26', which replaces flow controller 26 of Figure 1, normally operates at a constant control point setting and has the conventional provisions for manually adjusting the setting. These features of instruments 26' and 42' will be described in more detail in conjunction with Figure 9.

In applying the features of the invention as illustrated in Figure 2, the comparative pressure controller comprising instrument 45 is located at a relatively high point in the column and functions to vary the rate at which refluxing and cooling medium is returned from accumulator 33 to the upper portion of the column. Assuming that a change occurs in the operation of the column which causes the material undergoing fractionation at the control point to lose some of its lighter components and become too heavy, the "hydron" of the comparative vapor pressure controller will expand due to the decreased pressure about the "hydron" at the control point and this will reduce the pressure in the air output line 82 which, in this instance, connects instrument 45 with instrument 42'. The decreased air pressure in line 82 will in this instance adjust the set point of flow controller 42' to admit more steam to pump 39 and thus increase the rate of reflux return to the column. This will cause a decrease in the temperature prevailing in the upper portion of the column so that less light material is vaporized from the liquid on the tray at the control point and its vapor pressure and composition returns to the desired value. When a change in the opposite direction occurs at the control point, the pressure in line 82 is increased and the set point of instrument 42' is adjusted to decrease the steam supplied to pump 39 and thus decrease the rate of reflux return to the column.

Referring now to Figure 3, parts of the fractionating system corresponding in form and function to those of Figure 1 are again indicated by corresponding reference numerals. In this application of the features of the invention, the output air line 82 from instrument 45 is connected with the diaphragm of valve 47 in line 30 which controls the rate at which the overhead stream of vapors and/or gases is removed from the column or, alternatively, this rate may be controlled by a similar valve 47' in line 36 from the vapor space of the reflux accumulator, in which case the air output line from instrument 45 is connected through line 82' with the diaphragm of valve 47'.

The operating pressure of the column is maintained substantially constant by a control instrument 112 which may be an instrument like that illustrated in Figure 8 with a Bourdon tube connected to arm 86 instead of connecting this arm with the shaft 68, the latter being eliminated in this instance. The Bourdon tube is made responsive to the pressure prevailing within the column by the connecting line 114 leading from a suitable point in the column to the Bourdon tube. Variations in the pressure transmitted through line 114 to the Bourdon tube varies the pressure in the air output line 113 from instrument 112. Line 113 leads to the diaphragm of valve 22 in the line 21 through which the heating medium is supplied to the reboiler. Thus, when the pressure in the column decreases slightly, valve 22 is opened to supply more heat to the column and bring the pressure back to the desired value or, if the operating pressure in the column increases, the opening through valve 22 is restricted to supply less heat to the reboiler and bring the operating pressure of the column back to the desired value.

With a fairly constant operating pressure maintained in the column by instrument 112, as above described, instrument 45 controls the composition of the material undergoing fractionation at the control point selected, by the opening or closing of valve 47 or valve 47', to withdraw more or less light material from the top of the column. Like other forms of pressure controllers, instrument 112 will not hold an absolutely constant operating pressure in the column and the comparative vapor pressure controller, comprising instrument 45, as in the applications illustrated in Figures 1 and 2, is sensitive to and compensates for whatever variations occur in the operating pressure.

Let us assume for the sake of illustration that the ratio of light to heavy components in the feed supplied through line 17 to column 15 of Figure 3 increases. Since heat is being supplied to the column through the reboiler at a constant rate, an increase in the light components of the feed will increase vaporization within the column and this will cause an increase in the operating pressure. Instrument 112 then functions to reduce the amount of heat being supplied to the column through the reboiler which will decrease vaporization and bring the column back to substantially the same operating pressure as before. Meanwhile, an increased quantity of light components has probably reached the point above the feed inlet to the column at which instrument 45 is connected and in response to the resulting increased vapor pressure about the "hydrons" of the vapor pressure controller, the "hydrons" contract and cause instrument 45 to increase the pressure in its air output line 82 and increase the opening through valve 47 so that more light material is removed overhead from the column and the composition of the material undergoing fractionation at the control point returns to that which instrument 45 is set to maintain. Also, since the "hydrons" of the vapor pressure controller are sensitive to minor changes in the operating pressure of the column, instrument 45 also compensates for the somewhat inaccurate or delayed operation of instrument 112. Thus by the functioning of both instruments 112 and 45, operation of the column is stabilized at substantially the same operating pressure as prevailed before the composition of the feed changed, with a material of essentially the same composition as previously existed at the control point.

The mechanism of adjusting the set point of instruments, such as flow controller 26 of Figure 1 and flow controller 42' of Figure 2, for a different flow rate through the respective lines 21 and 40, by impulses transmitted to these flow controllers through line 82 from instrument 45, will be apparent to those familiar with instrumentation of this general type. The flow control instruments may be any one of the several well known forms and an illustration of one of these will suffice to clearly indicate how they may be utilized to obtain the objectives of the invention. For the sake of consistence, we will assume that the flow controller employed is one of the Taylor "Fullscope" controllers equipped with adjustable sensitivity and automatic reset like that illustrated in Figure 8 and described above, except that arm 85 is actuated by the difference in pressure prevailing on the upstream and downstream sides of orifice 23 in the case of instrument 26 or, in the case of instrument 42', by the difference in pressure prevailing on the upstream and downstream side of orifice 41; this being accomplished by a mercury manometer, interlinked Bourdon tubes, bellows or the like, linked to arm 85 in a conventional manner, not illustrated. The flow control instrument further differs from that illustrated in Figure 8 in that automatic means for adjusting the control point (i. e., the differential pressure which the instrument is set to maintain) are incorporated in the instrument. One suitable means of accomplishing this is illustrated in Figure 9 which will now be described.

In Figure 9, portions of the instrument corresponding in form and function to those of Figure 8 are designated by corresponding prime numbers. A "hydron" 120, receiving air pressure from the air output line 82 of instrument 45, is connected at its free end by shaft 121 with one side of an adjustable parallelogram 122, similar to the parallelogram 103 of Figure 8. A connect-rod 123, pivoted at one end to member 89' of the instrument and pivoted at its opposite end to a side of the parallelogram adjacent that to which shaft 121 is attached, connects the parallelogram 122 to member 89' in such a manner that an increase in the pressure transmitted to "hydron" 120 through line 82 resets the position of member 89' to give a higher pressure in the air output line from the instrument and vice versa. Thus, in instrument 26 of Figure 1, an increased pressure transmitted through line 82 to the adjusting mechanism comprising "hydron" 120 and parallelogram 122 will increase the pressure in the air output line from this instrument to valve 22 and, this valve being direct acting, the opening therethrough is thus reduced to decrease the supply of heat to the reboiler. As applied to instrument 42' of Figure 2, increased pressure in line 82 resets instrument 42' to give increased pressure in the air output line from this instrument to valve 44. In this case, valve 44 is also direct-acting, the increased pressure on the diaphragm serving to close the valve and decrease the flow of steam to pump 39, thereby slowing down the pump and decreasing the flow of refluxing medium through line 40 to the top of the column.

I claim as my invention:

1. In a fractionating column, the combination of a variable volume closed chamber disposed at a selected control point within said column and containing a fixed quantity of a reference fluid of known vapor pressure characteristics, the volume of said chamber being variable in response to variations in differential pressure between the inside and outside of the chamber, and means for adjusting the pressure differential between the interior and exterior of said chamber in response to changes in volume of said chamber.

2. In a fractionating column, the combination of a variable volume closed chamber disposed at a selected control point within said column and containing a fixed quantity of a reference fluid of known vapor pressure characteristics, the volume of said chamber being variable in response to variations in differential pressure between the inside and outside of the chamber, and means for varying the temperature at said selected control point in response to changes in volume of said chamber.

3. In a fractionating column, the combination of a variable volume closed chamber disposed at a selected control point within said column and containing a fixed quantity of a reference fluid of known vapor pressure characteristics, the volume of said chamber being variable in response to variations in differential pressure between the inside and outside of the chamber, and means for regulating the pressure at said selected control point in response to changes in volume of said chamber.

4. In a fractionating column, the combination of a variable volume closed chamber disposed at a selected control point within said column and containing a fixed quantity of a reference fluid of known vapor pressure characteristics, the volume of said chamber being variable in response to variations in differential pressure between the inside and outside of the chamber, an adjustable valve in a heating material supply line to said fractionating column, means for transposing changes in volume of said chamber into impulses, and means for transmitting said impulses to said adjustable valve for varying the latter.

5. In a fractionating column, the combination of a variable volume closed chamber disposed at a selected control point within said column and containing a fixed quantity of a reference fluid of known vapor pressure characteristics, the volume of said chamber being variable in response to variations in differential pressure between the inside and outside of the chamber, an adjustable valve in a reflux line to said fractionating column, means for transposing changes in volume of said chamber into impulses and means for transmitting said impulses to said adjustable valve for varying the latter.

6. In a fractionating column, the combination of a variable volume closed chamber disposed at a selected control point within said column and containing a fixed quantity of a reference fluid of known vapor pressure characteristics, the volume of said chamber being variable in response to variations in differential pressure between the inside and outside of the chamber, an adjustable valve in a vapor line from said column, means for transposing changes in volume of said chamber into impulses and means for transmitting said impulses to said adjustable valve for varying the latter.

7. In a fractionating column, the combination of an annular variable volume closed chamber containing a fixed quantity of a reference fluid of known vapor pressure characteristics and comprising spaced inner and outer concentric, flexible bellows-like walls, said annular chamber being so arranged within the fractionating column to permit circulation of fluid undergoing fractionation around said outer wall and through the inner cylindrical space formed by said inner wall, and means for adjusting the pressure differential between the interior and exterior of said chamber in response to variations in volume of the chamber.

8. In a fractionating column, the combination of an annular variable volume closed chamber containing a fixed quantity of a reference fluid of known vapor pressure characteristics and comprising spaced inner and outer concentric, flexible bellows-like walls, said annular chamber being so arranged within the fractionating column to permit circulation of fluid undergoing fractionation around said outer wall and through the inner cylindrical space formed by said inner wall, and means for varying the temperature in the column in response to changes in volume of said chamber.

9. In a fractionating column, the combination of an annular variable volume closed chamber containing a fixed quantity of a reference fluid of known vapor pressure characteristics and comprising spaced inner and outer concentric, flexible bellows-like walls, said annular chamber being so arranged within the fractionating column to permit circulation of fluid undergoing fractionation around said outer wall and through the inner cylindrical space formed by said inner wall, and means for regulating the pressure in the column in response to changes in volume of said chamber.

10. In a fractionating column, the combination of an annular variable volume closed chamber containing a fixed quantity of a reference fluid of known vapor pressure characteristics and comprising spaced inner and outer concentric, flexible bellows-like walls, said annular chamber being so arranged within the fractionating column to permit circulation of fluid undergoing fractionation around said outer wall and through the inner cylindrical space formed by said inner wall, means for introducing a refluxing liquid to the upper portion of the column, and means for regulating the supply of refluxing liquid to the column in response to changes in volume of said chamber.

CLARENCE G. GERHOLD.

REFERENCES CITED

The following references are of record in the file of this patent:

UNITED STATES PATENTS

| Number | Name | Date |
|---|---|---|
| 1,841,848 | Quinby | Jan. 19, 1932 |
| 1,913,684 | Purdy | June 13, 1933 |
| 1,942,446 | Peterkin | Jan. 9, 1934 |
| 2,054,579 | Affleck | Sept. 15, 1936 |
| 2,073,908 | Smith | Mar. 16, 1937 |
| 2,086,808 | Kallam | July 13, 1937 |
| 2,199,129 | Hamilton | Apr. 30, 1940 |
| 2,297,098 | Carney | Sept. 29, 1942 |

FOREIGN PATENTS

| Number | Country | Date |
|---|---|---|
| 264.873 | Great Britain | June 23, 1927 |